(No Model.)
L. SCHUTTE.
STEAM JET NOZZLE.
No. 519,796. Patented May 15, 1894.
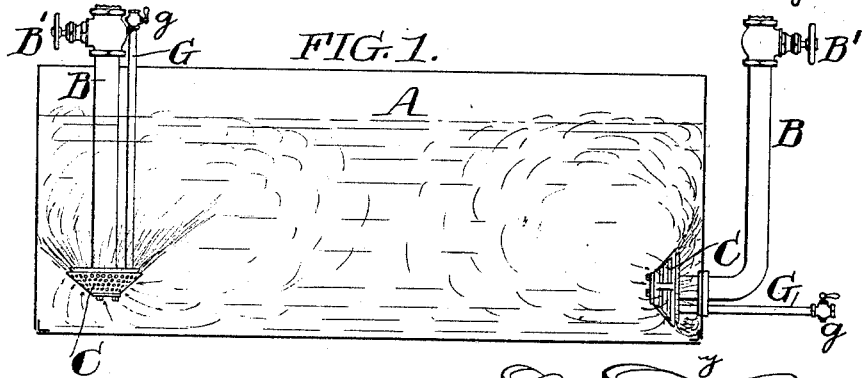
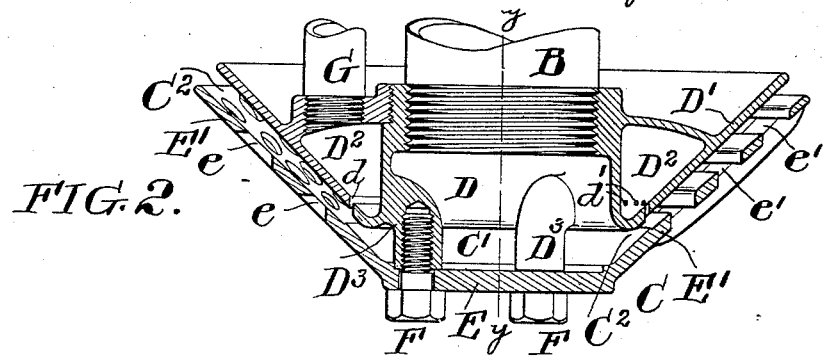
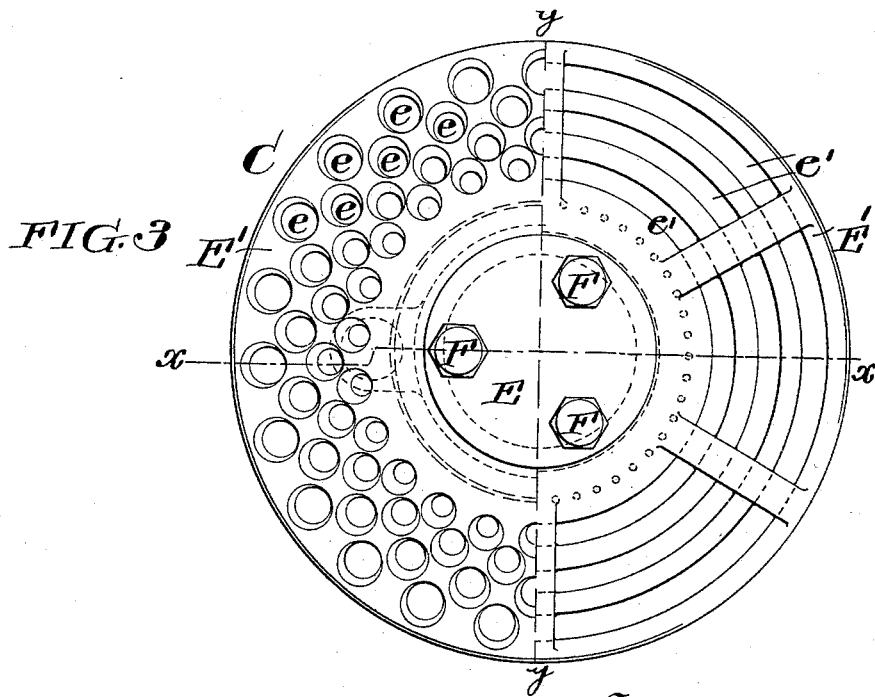
Witnesses:
Edw. F. Ayres
F. Hastings
Inventor.
Louis Schutte
by his atty.
Francis T. Chambers

UNITED STATES PATENT OFFICE.

LOUIS SCHUTTE, OF PHILADELPHIA, PENNSYLVANIA.

STEAM-JET NOZZLE.

SPECIFICATION forming part of Letters Patent No. 519,796, dated May 15, 1894.

Application filed March 5, 1894. Serial No. 502,323. (No model.)

*To all whom it may concern:*

Be it known that I, LOUIS SCHUTTE, a citizen of the United States, residing in the city and county of Philadelphia, in the State of Pennsylvania, have invented a certain new and useful Improvement in Steam-Jet Nozzles for Heating Fluids, of which the following is a true and exact description, reference being had to the accompanying drawings, which form a part thereof.

My invention relates to the heating of fluids by injecting steam into them, and has for its object to secure the efficient use of steam and at the same time to prevent the occurrence of the noise and vibration generally incident to the heating of fluids by means of live steam.

As heretofore constructed, steam jet nozzles used to heat liquid have embodied the principle of the induced current, the steam issuing through a central orifice, which was surrounded by a water inlet, and a current of water being thus established which surrounded the steam and in which the steam was condensed, imparting its heat to the water, and such devices have given better results than the more elemental plan of permitting steam to escape directly into a tank from a series of holes in a supply pipe but have only mitigated, without entirely overcoming, the objectionable features incident to the heating of liquids by live steam. One cause of noise and jar is the sudden condensation of steam bubbles in the liquid, this occurring, of course, when the liquid in the tank is comparatively cool; trouble from this source will naturally diminish as the temperature of the liquid increases, but, as a high range of temperatures is reached, the steam tends to pass through the hot liquid, escaping at the surface and causing not only violent ebullition, but a loss of steam and heat.

Now my invention has for its object to provide a nozzle which will prevent either of the troubles noted, irrespective of varying temperature in the tank, and it consists, generally speaking, in a steam jet nozzle of an annular and outwardly flaring form provided with orifices in the walls of the jet orifice through which the liquid is drawn into and incorporated with the steam jet, preferably the jet not only flares outward, but backward, the fluid entering through orifices in the conical face of the jet wall, a better circulation in the tank is thus secured.

My invention further consists in introducing air into the flared jets through an annular orifice, or series of orifices, in the nozzle; this is not essential however, but a decided improvement at certain stages, particularly when the liquid is heated nearly to the boiling point, when it prevents the escape of large volumes of steam from the surface of the liquid.

Reference being now had to the drawings which illustrate my invention, Figure 1 is an elevation of a tank provided with two of my improved nozzles. Fig. 2 is a section on the line $x$—$x$ of Fig. 3 showing my steam jet nozzle in two modifications, one on each side of the line $y$—$y$, and Fig. 3 is a face view of the nozzle, showing on each side of line $y$—$y$ slightly modified constructions.

A is a tank.

B indicates a steam supply pipe having a controlling cock B' and extending into the tank A.

C is my improved steam jet nozzle which is secured to the end of pipe B in any convenient way, as by screwing as shown, and which is formed with an outwardly flaring annular jet orifice $C^2$ through the walls of which orifices are pierced to admit the liquid, said orifices consisting either of a series of holes as $e$ or a series of slots as $e'$. I prefer to make the annular jet flare backward as shown, the orifices $e$ or $e'$ being formed in the conical face of the outer wall E'. I also prefer to provide the nozzle with a steam chamber C' from which the jet $C^2$ leads, and as the best method of construction, I recommend that shown, the nozzle being made up of a casting D having an annular flared rim D' and lugs $D^3$ to which is attached, as by screws F, a plate E having the flange E' which forms with flange D' the jet orifice. I prefer also to provide an annular air passage leading into the jet $C^2$ and such a passage is shown at $d$ consisting of a slot in flange D' while at $d'$ it is made up of a series of holes. This passage must of course, be connected to the atmosphere, and I prefer to form an air chamber $D^2$ in casting D, into which I lead an air pipe G which should have a cock $g$, as shown.

Having now described my invention, what I claim as new, and desire to secure by Letters Patent, is—

1. As a device for heating fluids in tanks, an outwardly flared annular steam jet nozzle having a series of openings in its walls for the admission of fluid to the jet.

2. As a device for heating fluids in tanks, an outwardly flared annular steam jet nozzle having a series of openings in its walls for the admission of fluid to the jet in combination with an annularly arranged air port or ports opening into the jet nozzle.

3. The steam jet nozzle C having a steam chamber C', an annular outwardly flaring jet delivery passage C$^2$, a wall as E' of which passage is provided with orifices for the admission of fluid, an annular air chamber as D$^2$, and an annular opening or series of openings leading from the air chamber to the passage C$^2$.

4. As a device for heating fluids in tanks an outwardly and backwardly flared annular steam jet nozzle having a series of openings in its walls for the admission of fluid to the jet.

LOUIS SCHUTTE.

Witnesses:
ALF. H. FABER,
D. STEWART.